US010380256B2

(12) United States Patent
Nachman et al.

(10) Patent No.: US 10,380,256 B2
(45) Date of Patent: Aug. 13, 2019

(54) TECHNOLOGIES FOR AUTOMATED CONTEXT-AWARE MEDIA CURATION

(71) Applicant: Intel Corporation, Santa Clara, CA (US)

(72) Inventors: Lama Nachman, Santa Clara, CA (US); Ashwini Asokan, Sunnyvale, CA (US); Giuseppe Raffa, Portland, OR (US); Rita H. Wouhaybi, Portland, OR (US); Saurav Sahay, Santa Clara, CA (US); Omar U. Florez, Sunnyvale, CA (US); Rahul C. Shah, San Francisco, CA (US); Chieh-Yih Wan, Beaverton, OR (US); Jonathan J. Huang, Pleasanton, CA (US); Hong Lu, Santa Clara, CA (US); Sangita Sharma, Portland, OR (US); Junaith Ahemed Shahabdeen, San Jose, CA (US); Douglas P. Bogia, Forest Grove, OR (US); Lenitra Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 765 days.

(21) Appl. No.: 14/866,889

(22) Filed: Sep. 26, 2015

(65) Prior Publication Data

US 2017/0091628 A1 Mar. 30, 2017

(51) Int. Cl.
  *G06F 17/27* (2006.01)
  *G06N 5/02* (2006.01)
  *G06F 16/9535* (2019.01)

(52) U.S. Cl.
  CPC ...... *G06F 17/2785* (2013.01); *G06F 16/9535* (2019.01); *G06N 5/022* (2013.01)

(58) Field of Classification Search
  None
  See application file for complete search history.

(56) References Cited

U.S. PATENT DOCUMENTS

| | | | |
|---|---|---|---|
| 8,452,855 B2 * | 5/2013 | Higgins | H04W 4/02 709/219 |
| 2006/0080356 A1 * | 4/2006 | Burges | G06F 17/30017 |

(Continued)

*Primary Examiner* — Alan Chen
(74) *Attorney, Agent, or Firm* — Barnes & Thornburg LLP

(57) ABSTRACT

Technologies for automated context-aware media curation include a computing device that captures context data associated with media objects. The context data may include location data, proximity data, behavior data of the user, and social activity data. The computing device generates inferred context data using one or more cognitive or machine learning algorithms. The inferred context data may include semantic time or location data, activity data, or sentiment data. The computing device updates a user context model and an expanded media object graph based on the context data and the inferred context data. The computing device selects one or more target media objects using the user context model and the expanded media object graph. The computing device may present context-aware media experiences to the user with the target media objects. Context-aware media experiences may include contextual semantic search and contextual media browsing. Other embodiments are described and claimed.

25 Claims, 4 Drawing Sheets

(56) References Cited

U.S. PATENT DOCUMENTS

| | | | | |
|---|---|---|---|---|
| 2012/0059826 A1* | 3/2012 | Mate | ............... | G06F 17/30843 |
| | | | | 707/737 |
| 2012/0254097 A1* | 10/2012 | Flinn | ............... | G06N 7/02 |
| | | | | 706/52 |
| 2013/0204664 A1* | 8/2013 | Romagnolo | ....... | G06Q 30/0203 |
| | | | | 705/7.32 |
| 2014/0365484 A1* | 12/2014 | Freeman | ............... | H04W 4/21 |
| | | | | 707/736 |
| 2017/0075927 A1* | 3/2017 | Duggal | ............... | G06F 17/3028 |
| 2017/0078621 A1* | 3/2017 | Sahay | ............... | G06F 17/2229 |

\* cited by examiner

TECHNOLOGIES FOR AUTOMATED CONTEXT-AWARE MEDIA CURATION

BACKGROUND

Information retrieval is an important application for current computing systems, including search, content recommendation, and other personal assistant applications. Typical information retrieval systems focus on text for very specific information (e.g., location or text) that tags other information objects. Information retrieval for media such as images and videos typically relies on specific metadata inserted in or attached to the media manually by users. Media annotations may be made by users and augmented with simple tags such as time and location. Other image search experiences may rely on face recognition or color and image analysis techniques but may not consider higher-level contextual information associated with the image.

Users are increasingly producing, consuming, and sharing large amounts of digital media. For example, the spread of smartphones and other mobile devices has allowed many users to have constant access to a digital camera and other media capture capabilities. In light of the increasing volume of digital media available, many users may have difficulty retrieving or otherwise accessing images or other media after creation.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
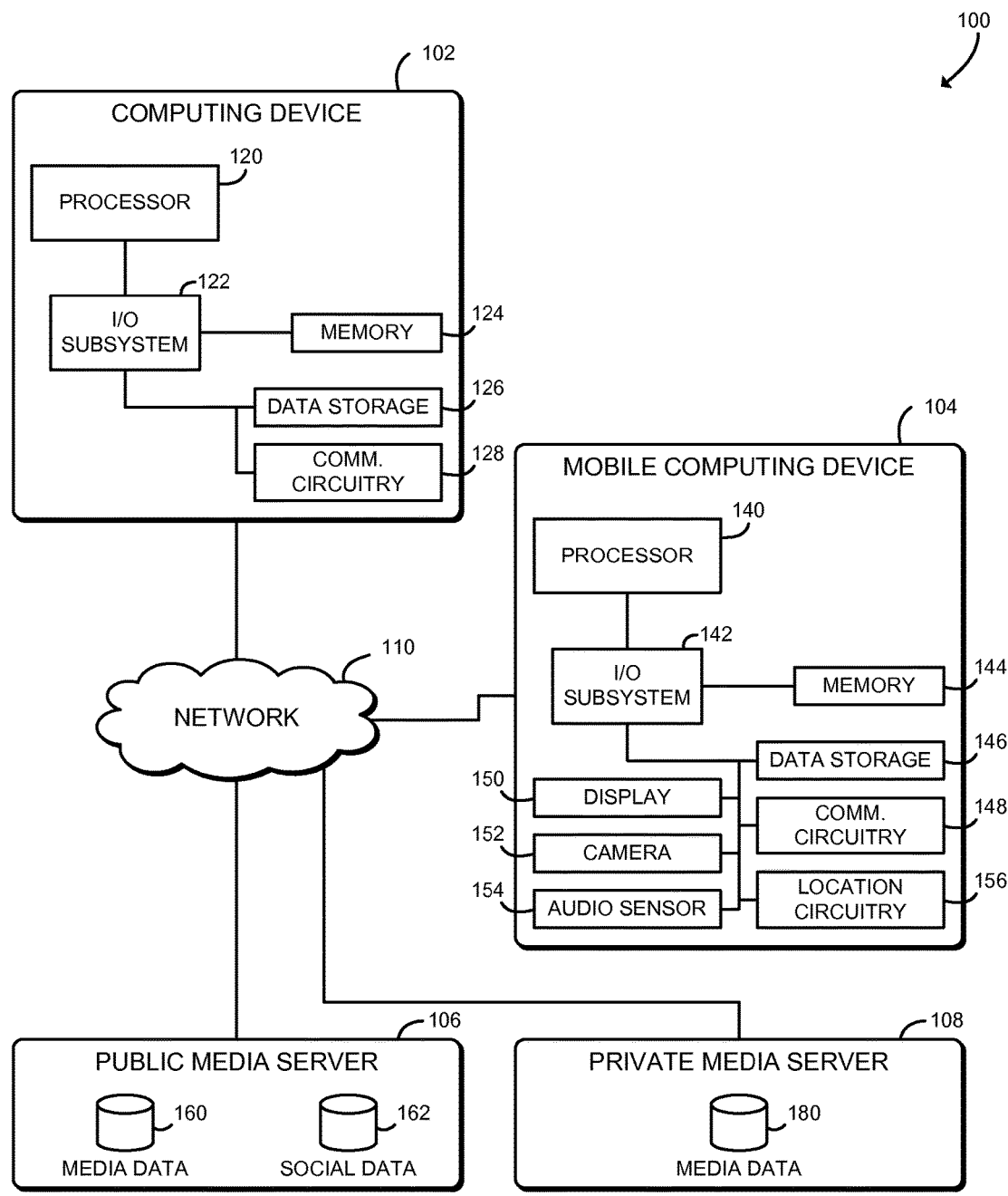
FIG. 1 is a simplified block diagram of at least one embodiment of a system for context-aware media curation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for context-aware media curation includes a computing device 102 and may also include a mobile computing device 104, a public media server 106, and a private media server 108 in communication over a network 110. In use, as described in more detail below, the computing device 102 analyzes a collection of media objects provided by a user, such as images or videos. The media objects may come from multiple sources; for example, the media objects may be captured by the mobile computing device 104 and/or hosted by the public media server 106 or private media server 108. The computing device 102 captures context data related to the current context of the media objects being accessed by the user and performs cognitive and machine learning algorithms to infer higher-order context data. The computing device 102 tracks the context of the user(s) over time and associates this context with the media objects. Using the context data, the computing device 102 provides one or more media experiences to the user. Although illustrated as including a single mobile computing device 104, public media server 106, and private media server 108, it should be understood that in some embodiments the system 100 may include any number of those devices. By leveraging continuous context capture from different sources, high-level inferences, and continuous learning and adaptation, the system 100 enables rich media experiences and user engagement that go beyond a typical linear media experience (such as a timeline or a location-based map). Additionally, the modular context capture, processing, and media experience architecture of the system 100 may allow for use across a broad range of context and content sources and may allow for a broad range of context-aware experiences.

The computing device 102 may be embodied as any type of computation or computer device capable of performing the functions described herein, including, without limitation, a computer, a server, a rack-mounted computing device, a desktop computer, a workstation, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively includes a processor 120, an input/output subsystem 122, a memory 124, a data storage device 126, and communication circuitry 128. Of course, the computing device 102 may include other or additional components, such as those commonly found in a server (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processors 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. As described further below, the data storage device 126 may store and/or index various media objects and associated context data.

The communication circuitry 128 of the computing device 102 may be embodied as any communication circuit, device, or collection thereof, capable of enabling communications between the computing device 102, the mobile computing device 104, the public media server 106, the private media server 108, and/or other remote devices over the network 110. The communication circuitry 128 may be configured to use any one or more communication technology (e.g., wired or wireless communications) and associated protocols (e.g., Ethernet, Bluetooth®, Wi-Fi®, WiMAX, etc.) to effect such communication.

The mobile computing devices 104 may be embodied as any type of computation or computer device capable of performing the functions described herein, including, without limitation, a smartphone, a mobile audio or video player, a computer, a desktop computer, a workstation, a laptop computer, a notebook computer, a tablet computer, a wearable computing device, a network appliance, a web appliance, a distributed computing system, a processor-based system, and/or a consumer electronic device. The mobile computing device 104 may include components and devices commonly found in a smartphone or similar computing device, such as a processor 140, an I/O subsystem 142, a memory 144, a data storage device 146, communication circuitry 148, and/or other peripheral devices. Those individual components of the mobile computing device 104 may be similar to the corresponding components of the computing device 102, the description of which is applicable to the corresponding components of the mobile computing device 104 and is not repeated herein so as not to obscure the present disclosure.

The mobile computing device 104 may also include a display 150, a camera 152, an audio sensor 154, and location circuitry 156. The display 150 may be embodied as any type of display capable of displaying digital information such as a liquid crystal display (LCD), a light emitting diode (LED), a plasma display, a cathode ray tube (CRT), or other type of display device. As described below, the display 150 may be used to display a media objects or other information to the user of the mobile computing device 104.

The camera 152 may be embodied as a digital camera or other digital imaging device integrated with the mobile computing device 104 or otherwise communicatively coupled thereto. The camera 152 includes an electronic image sensor, such as an active-pixel sensor (APS), e.g., a complementary metal-oxide-semiconductor (CMOS) sensor, or a charge-coupled device (CCD). The camera 152 may be used to capture images of the environment and/or user of the mobile computing device 104 including, in some embodiments, capturing still images or video images. Similarly, the audio sensor 154 may be embodied as any sensor capable of capturing audio signals such as a microphone, a line input jack and associated circuitry, an analog-to-digital converter (ADC), or other type of audio sensor. The audio sensor 154 may be used to detect the audio environment of the mobile computing device 104.

The location circuitry 156 of the mobile computing device 104 may be embodied as any type of circuit capable of determining the precise or approximate position of the mobile computing device 104. For example, the location circuitry 156 may be embodied as a global positioning system (GPS) receiver, capable of determining the precise coordinates of the mobile computing device 104. In other embodiments, the location circuitry 156 may triangulate or trilaterate the position of the mobile computing device 104 using distances or angles to cellular network towers with known positions, provided by the communication circuitry 148. In other embodiments, the location circuitry 156 may determine the approximate position of the mobile computing device 104 based on association to wireless networks with known positions, using the communication circuitry 148.

The public media server 106 is configured to provide access to a collection of media objects such as images or videos. The public media server 106 may provide unrestricted access to the media objects or may allow a user to selectively share media objects with particular other persons. In some embodiments, the public media server 106 may also provide social media services. The public media server 106 may store, maintain, or otherwise access media data 160 and/or social data 162. The media data 160 may include or reference the media objects, and the social data 162 may include or reference social media interaction data such as comments, "likes," social graph data, and other social media data.

The public media server 106 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. Thus, the public media server 106 includes components and devices commonly found in a server or similar computing device, such as a processor, an I/O subsystem, a memory, a data storage device, and/or communication circuitry. Those individual components of the public media server 106 may be similar to the corresponding components of the computing device 102 and/or the mobile computing device 104, the description of which is applicable to the corresponding components of the public media server 106 and is not repeated herein so as not to obscure the present disclosure. Additionally, in some embodiments, the public media server 106 may be embodied as a "virtual server" formed from multiple computing devices distributed across the network 110 and operating in a public or private cloud. Accordingly, although the public media server 106 is illustrated in FIG. 1 as embodied as a single server computing device, it should be appreciated that the public media server 106 may be embodied as multiple devices cooperating together to facilitate the functionality described below.

The private media server 108 is configured to provide access to a collection of media objects such as images or videos. The private media server 108 may provide restricted access to the media objects of a particular user. For example, the private media server 108 may be embodied as a file server, media server, cloud backup server, or other networked private media storage system. The private media server 108 may store, maintain, or otherwise access media data 180, which may include or reference media objects.

The private media server 108 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. Thus, the private media server 108 includes components and devices commonly found in a server or similar computing device, such as a processor, an I/O subsystem, a memory, a data storage device, and/or communication circuitry. Those individual components of the private media server 108 may be similar to the corresponding components of the computing device 102 and/or the mobile computing device 104, the description of which is applicable to the corresponding components of the private media server 108 and is not repeated herein so as not to obscure the present disclosure. Additionally, in some embodiments, the private media server 108 may be embodied as a "virtual server" formed from multiple computing devices distributed across the network 110 and operating in a public or private cloud. Accordingly, although the private media server 108 is illustrated in FIG. 1 as embodied as a single server computing device, it should be appreciated that the private media server 108 may be embodied as multiple devices cooperating together to facilitate the functionality described below.

As discussed in more detail below, the computing device 102, the mobile computing device 104, the public media server 106, and the private media server 108 may be configured to transmit and receive data with each other and/or other devices of the system 100 over the network 110. The network 110 may be embodied as any number of various wired and/or wireless networks. For example, the network 110 may be embodied as, or otherwise include, a wired or wireless local area network (LAN), a wired or wireless wide area network (WAN), a cellular network, and/or a publicly-accessible, global network such as the Internet. As such, the network 110 may include any number of additional devices, such as additional computers, routers, and switches, to facilitate communications among the devices of the system 100.

Additionally, although the system 100 is illustrated as including the computing device 102, the mobile computing device 104, the public media server 106, and the private media server 108, it should be understood that some or all of the functions of those devices may be combined into a single device. For example, a single server device may perform some or all of the functions of the computing device 102, the public media server 106, and/or the private media server 108.

Figure 2:
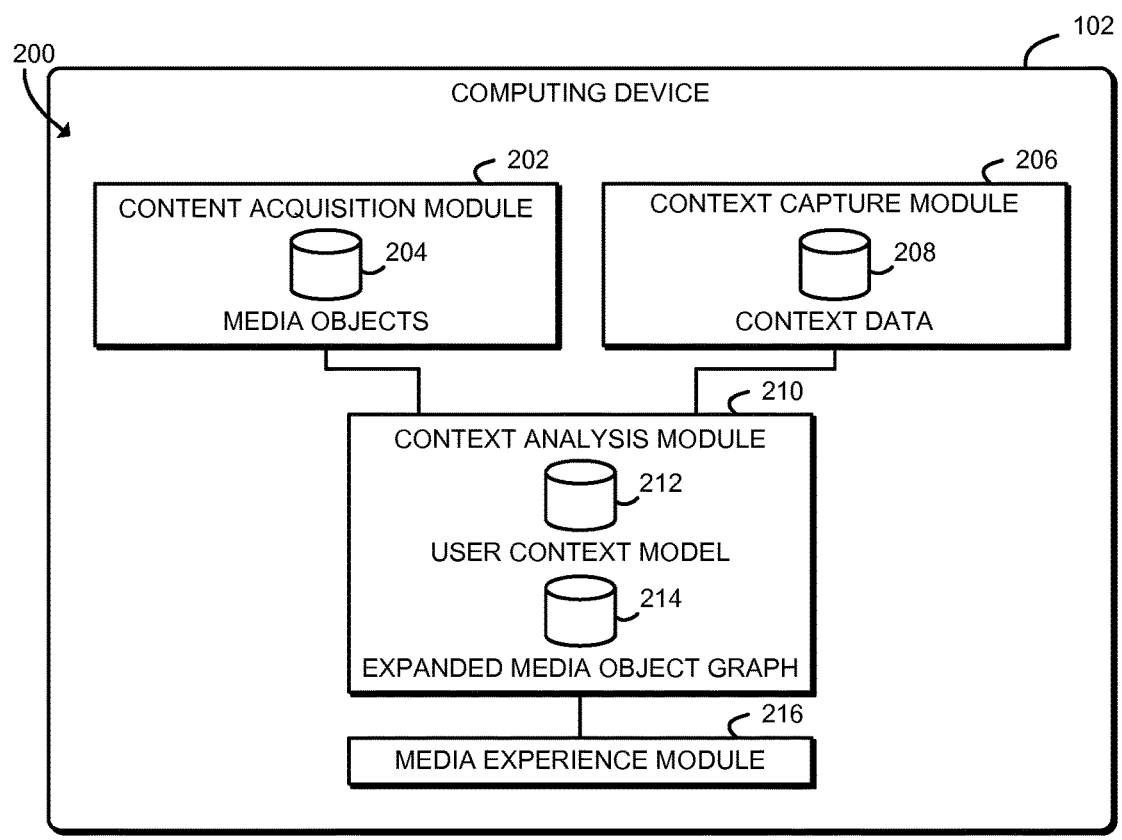
FIG. 2 is a simplified block diagram of at least one embodiment of an environment that may be established by a computing device of FIG. 1.

Referring now to FIG. 2, in an illustrative embodiment, the computing device 102 establishes an environment 200 during operation. The illustrative environment 200 includes a content acquisition module 202, a context capture module 206, a context analysis module 210, and a media experience module 216. The various modules of the environment 200 may be embodied as hardware, firmware, software, or a combination thereof. For example the various modules, logic, and other components of the environment 200 may form a portion of, or otherwise be established by, the processor 120 or other hardware components of the computing device 102. As such, in some embodiments, any one or more of the modules of the environment 200 may be embodied as a circuit or collection of electrical devices (e.g., content acquisition circuitry 202, context capture circuitry 206, etc.).

The content acquisition module 202 is configured to acquire one or more media objects 204. The content acquisition module 202 may acquire the media objects 204 from the mobile computing device 104 associated with the user, from a public media server 106, and/or from a private media server 108.

The context capture module 206 is configured to capture context data 208 that is associated with one or more of the media objects 204. The context data 208 may include location data, user behavior data, social activity data, proximity data, audio data and/or other data indicative of the context of a media object 204, including the current context of the user while interacting with a media object 204 (for example, accessing, using, capturing, or performing other operations on the media object 204). As described further below, the proximity data may be embodied as data that is indicative of persons near the mobile computing device 104. The proximity data may then be associated with a media object 204.

The context analysis module 210 is configured to generate inferred context data based on the context data 208. The inferred context data may be associated with the context of a media object 204 and/or the current context of a user while interacting with a media object 204 Generating the inferred context data may include generating semantic location data, generating semantic time data, generating semantic activity labels, classifying an audio environment based on audio data, analyzing image data of the media objects 204, or performing other cognitive or machine learning analysis. In some embodiments, the context analysis module 210 may be configured to generate the inferred context data based on social activity data, for example by extracting one or more keywords from the social activity data or performing sentiment analysis on the social activity data. The context analysis module 210 is further configured to update a user context model 212 based on the context data 208 and the inferred context data. The user context model 212 represents captured and inferred context data related to the user, and includes current user context and historical user context. The context analysis module 210 is further configured to generate an expanded media object graph 214 based on the context data 208 and the inferred context data. The expanded media object graph 214 may be indicative of relationships between the media objects 204, which are established based on contextual features of the media objects 204.

The media experience module 216 is configured to select one or more target media objects from the media objects 204 based on the user context model 212 and the expanded media object graph 214. The media experience module 216 may be further configured to provide the one or more target media objects to the mobile computing device 104 and/or to provide the inferred context data to the user. To select the one or more target media objects, the media experience module 216 may be configured to perform a contextual semantic search of the media objects 204, or to select the one or more target media objects based on similarity between the expanded media object graph 214 associated with the target media objects and the current user context of the user context model 212. The media experience module 216 may be configured to group the one or more target media objects based on the inferred context data, for example by activity. The media experience module 216 may be further configured to recommend one or more target persons associated with the one or more target media objects for media sharing based on the user context model 212 and the expanded media object graph 214.

Figure 3A:
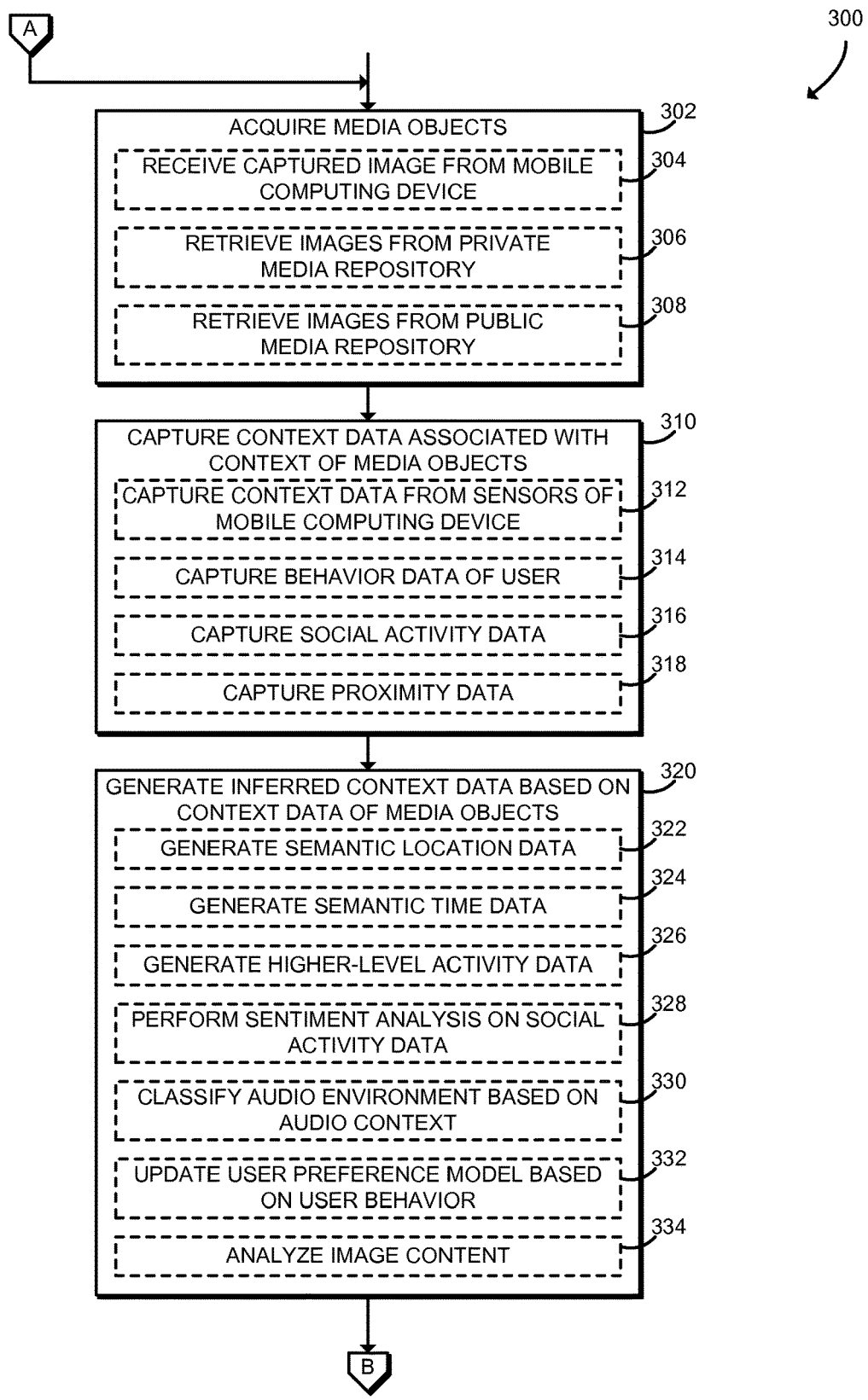
FIGS. 3A and 3B are a simplified flow diagram of at least one embodiment of a method for context-aware media curation that may be executed by the computing device of FIGS. 1 and 2.
Figure 3B:
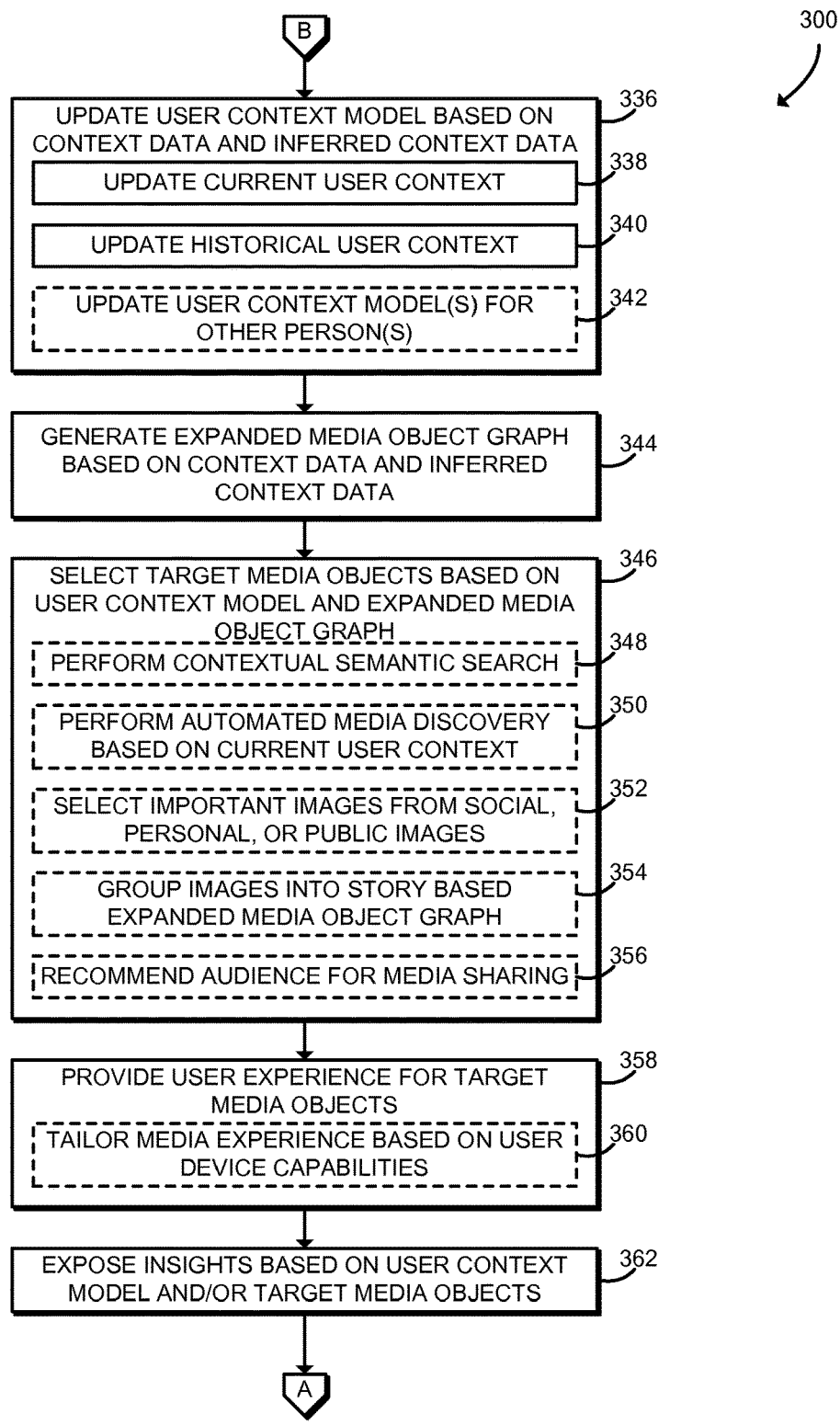

Referring now to FIGS. 3A and 3B, in use, the computing device 102 may execute a method 300 for context-aware media curation. The method 300 begins with block 302, in which the computing device 102 acquires one or more media objects. The media objects may include image files, video files, audio files, or any other media data. The computing device 102 may use any technique to acquire the media objects. For example, the computing device 102 may copy the media objects, create references to the media objects, index the media objects, or otherwise access the media objects. The computing device 102 may acquire media objects in response to a command from a user, or in some embodiments may acquire media objects without user input, for example by crawling websites and social media servers, accessing news feeds, or otherwise accessing a media repository. In some embodiments, in block 304 the computing device 102 may receive one or more images from a mobile computing device 104 that were captured by the mobile computing device 104. For example, the user may upload or otherwise submit images captured with the camera 152 of the mobile computing device 104 to the computing device 102. In some embodiments, in block 306 the computing device 102 may retrieve one or more images from a private media repository, such as the media data 180 maintained by the private media server 108. For example, the computing device 102 may retrieve images from a private cloud image service associated with a user. In some embodiments, in block 308 the computing device 102 may retrieve one or more images from a public media repository, such as the media data 160 maintained by the public media server 106. For example, the computing device 102 may retrieve images from a public web server or a public social media network.

In block 310, the computing device 102 captures context data 208 associated with the context of one or more of the media objects 204. The context data 208 may be embodied as any sensor data, metadata, textual content, user interactions, or other information related to the context of the media objects 204 or to the current context of a user while interaction with a media object 204. As described below, the context data 208 may be analyzed and correlated with user context data stored in a user context model 212. In some embodiments, in block 312 the computing device 102 may capture sensor data or other data available to the mobile computing device 104 associated with the user. Because the mobile computing device 104 is typically carried by the user, such sensor data may be indicative of the environment or other context of the user. For example, the computing device 102 may capture location data produced by the location circuitry 156 of the mobile computing device 104. The location data may embodied as geographical coordinates or as other location information such as available wireless networks (e.g., wireless SSIDs, MAC addresses, or other identifiers). As another example, the computing device 102 may capture audio data generated by the audio sensor 154 of the mobile computing device 104.

In some embodiments, in block 314 the computing device 102 may capture behavior data that is indicative of the user's interactions with the mobile computing device 104. The behavior data may include user interactions with one or more media objects. For example, the behavior data may include whether a particular media object is accessed, time spent accessing the media object, and user feedback related to the media object (e.g., comments, "likes," and other express feedback, or implicit feedback such as time spent accessing the media object, scroll speed while accessing the media object, and other behavior).

In some embodiments, in block 316 the computing device 102 may capture social activity data associated with the current user context. For example, the computing device 102 may receive social data 162 maintained by a public media server 106 such as a social network server. The social activity data may include captions, comments, "likes," "favorites," or other indications of sentiment, sharing activity including recipients, and other social activity data. The social activity data may include activity performed by the user, for example with a mobile computing device 104, or activities performed by other persons. The social activity data may be related to one or more media objects. For example, the social activity data may include comments associated with a media object that are produced by the user with the mobile computing device 104 as well as comments associated with the same media object produced by other persons in the user's social network.

In some embodiments, in block 318 the computing device 102 may capture proximity data. The proximity data may include any data that may identify which persons are currently near the user. The computing device 102 may determine the proximity data, for example, by accessing an external service or by performing radio scanning. The computing device 102 may, for example, perform one or more wireless discovery scans using Bluetooth®, Wi-Fi®, or other wireless protocols to discover nearby devices. The presence of those nearby devices may indicate the presence of associated persons, for example an owner or other user of a nearby device.

In block 320, the computing device 102 generates inferred context data based on the context data 208 associated with the media objects 204. As described above, the context data 208 may be associated with the current context of the user while interacting with the media objects 204 (e.g., accessing, using, capturing, or performing other operations on the media objects 204). The computing device 102 may perform one or more cognitive and machine learning algorithms on the context data 208 in order to generate higher-order inferred context data that may be used as input to context-aware media experiences, as described further below. For example, in some embodiments the context data 208 may be embodied as a vector of context data and associated relevance values. Each element of context data may have an associated probabilistic score. For example, the probabilistic scores may be determined using cognitive and machine learning algorithms described below. Additionally, in some embodiments all of the context data may be merged and all of the probabilities may be additive, allowing the computing device 102 to assert certain contexts with a higher value. For example, through audio analysis, the computing device 102 might detect that a particular person is present with low confidence because the computing device 102 only "heard" that person once. However, through face identification, device proximity, calendar of events, and other contextual analysis, confidence in that person's presence may be increased.

In some embodiments, in block 322 the computing device 102 may generate semantic location data associated with the context of the media objects 204. The semantic location data identifies a possible semantic meaning associated with the location of the media object 204. For example, the semantic location data may include a location label such as "home," "work," "café," "tourist destination," or similar label. The semantic location data may be determined, for example, by smoothing and clustering the location trace data in time and space to identify coordinates (e.g., latitude/longitude) and then using a lookup service to identify the most likely semantic meaning. In some embodiments, in block 324 the computing device 102 may generate semantic time data associated with the context of the media objects 204. The semantic time data identifies a possible semantic meaning associated with a particular time. For example, the semantic time data may identify a part of the day, a part of the week, or an associated public or private event.

In some embodiments, in block 326 the computing device 102 may generate higher-level activity data associated with the context of the media objects 204. The higher-level activity data may include a semantic classification or label associated with the context. For example, the higher-level activity may include a label such as "travel," "friends," "academic," "hangout," "party," or other activity label. To determine the higher-level activity, the computing device 102 may extract and augment keywords from any text data associated with the media objects 204 using natural language processing techniques. For example, the computing device 102 may analyze textual content associated with one or more media objects, such as a title, comments, or the computing device 102 may analyze captured keywords from social activity data. Based on the textual content, the computing device 102 may predict a distribution of activities and associate the current context with the most likely activity (e.g., "family," "travel," "health," "technology," "education," "fun," "food," "sport," "wedding," "summer," "winter," "trip," etc.).

In some embodiments, in block 328 the computing device 102 may perform sentiment analysis to associate a sentiment feature with the context of the media objects 204. The computing device 102 may perform sentiment analysis based on activity associated with one or more media objects. The computing device 102 may also aggregate sentiment features for albums or other collections of media objects, and may associate mood streams with users. The computing device 102 may consider, for example, various mood states and sentiments associated with the media objects. The computing device 102 may consider whether people (e.g., the user's friends) are excited about a media object that the person has shared, whether people are posting good things about the media object, whether people's attitudes are enduring and positively disposed toward the shared media objects, the diversity of sentiments across comments associated with a media object, and other sentiments. The computing device 102 may analyze posts, conversations, and media object content (e.g., image content) to extract this rich psycho-linguistic information, which may be fed into recommendation engines to make effective recommendations as described further below. The computing device 102 may use, for example, a domain adaptable polarity detection classifier algorithm for rich ternary sentiment modeling and may use rich linguistic resources for mood mapping and analytics. The computing device 102 may also discriminate between short and long term sentiments and interests, which may also be used when recommending or associating media objects.

In some embodiments, in block 330 the computing device 102 may classify the audio environment associated with the context of the media objects 204 based on audio context data. As described above, the audio context data may include, for example, audio data captured using the audio sensor 154 of the mobile computing device 104. The computing device 102 may classify the audio environment by identifying or interpreting recorded sounds (e.g., laughing, music, crowd noise, etc.), extracting keywords from spoken language, identifying one or more persons speaking, or performing other audio analysis.

In some embodiments, in block 332 the computing device 102 may update one or more user preference models based on user behavior. The computing device 102 may determine user behavior based on, for example, interactions with the media object (e.g., comments, "likes," time spent viewing, scroll speed), aggregation of social activity (e.g., comments, "likes," posts, sharing, viewing, etc.) or other monitored user activity. As described above, the computing device 102 may perform keyword extraction and augmentation on the textual content associated with the current user context using one or more natural language processing techniques.

In some embodiments, in block 334 the computing device 102 may analyze image content of one or more media objects 204 to generate higher-order inferred context. The computing device 102 may, for example, identify objects or persons in the image by analyzing the composition of the image, analyzing a color histogram of the image, or performing facial recognition. The computing device 102 may determine interest and/or interaction with particular objects in the image, for example using data made available by a camera-array or light-field camera. Using the camera-array or light field data, the computing device 102 may determine the interest of the viewer on particular areas of the image (e.g., the background or foreground) or objects in the picture (e.g., kids, nature elements, animals, cars, buildings, etc.).

In block 336, shown in FIG. 3B, the computing device 102 updates a user context model 212 based on the captured context data 208 and the inferred context data. The user context model 212 represents the individualized preferences, behavior, activities, and other context associated with the user. The user context model 212 may be based on context information associated with one or more media objects 204 (e.g., a trace of locations where the media object 204 has been viewed by the user) as well as context information associated with the user (e.g., the current location of the user). The user context model 212 represents both the current context of the user as well as historical user context. As described further below, the user context model 212 (including current context and historical context, as well as context information relating to the user and to the media objects 204) may be used to select target media objects and provide compelling media experiences. In block 338, the computing device 102 updates the current user context of the user context model 212. The current user context may represent the current location, activity, behavior, sentiment, or other current context of the user and/or of the mobile computing device 104. In block 340, the computing device 102 updates historical user context of the user context model 212. The historical user context represents past location, activity, behavior, sentiment, or other historical context of the user and/or of the mobile computing device 104. In some embodiments, in block 342 the computing device 102 may update one or more context models associated with persons other than the user based on that other person's location, activity, behavior, sentiment, or other context data (e.g., determined based on social activity data).

In block 344, the computing device 102 generates an expanded media object graph 214 based on the captured context data 208 and the inferred context data. The expanded media object graph 214 may include relationships between various media objects 204. The relationships may be created based on contextual data 208 or inferred context data included in the media objects, created by the mobile computing device 104 during capture of the media objects, or otherwise associated with the media objects. For example, the expanded media object graph 214 may include semantic location information, semantic time information, higher-level activity data, sentiment data, audio environment data, user preferences data, image content data, and other contextual data 208 and inferred context data associated with the media objects 204.

In block 346, the computing device 102 selects one or more target media objects based on the user context model 212 and the expanded media object graph 214. The target media objects may be selected to provide media discovery, media search, media sharing, or other user media experiences, as described further below. In some embodiments, in block 348 the computing device 102 may perform contextual semantic search in the media objects 204 based on the current context of the user. The computing device 102 may select target media objects having one or more contextual features that match features of the current context of the user. Essentially, the current context of the user may be used as an implicit search term. In some embodiments, the current user context may also be combined with other contextual searches. For example, the computing device 102 may perform a hybrid search using one or more words as input, contextual queries (e.g., location is "coffee shop"), or a combination of inputs. The computing device 102 may perform probabilistic ranking of media objects 204 based on query terms and other contextual inputs. For example, the user may specify a restaurant in San Francisco with a particular friend during summer time, and the computing device 102 may prioritize media objects based those contextual features. In some embodiments, in block 350 the computing device 102 may perform automated media discovery based on the current user context. The computing device 102 may, for example, combine all captured context to rank media objects 204 in a holistic manner so that media objects that more closely match the current context (e.g., matching location, nearby persons, sentiment, etc.) are selected.

In some embodiments, in block 352 the computing device 102 may select important images or other media objects 204 from a personal, social, and/or public image repository based on the user context model 212. As described above, the computing device 102 may continually update the user context model 212 to indicate the types of images or other media typically preferred by the user. To select important images, the computing device 102 may rank images in order using the user preferences model to predict relevance to the user of each image and select higher-ranked images. The computing device 102 may, for example, perform cognitive and statistical algorithms to select the images. The cognitive algorithm may, as described above, rely on user models that compute and store short term and long term interests of users generated from social activity data. The statistical algorithm may capture the consumption of various media objects and use collaborative filtering algorithms to select recommended images for the user as well as images related to another image. As described above, the target images may be selected from a personal image repository, a social repository (e.g., friends' images), and/or a public repository (e.g., a world news image server). In block 354, in some embodiments the computing device 102 may group two or more selected images into a story based on higher-order inferred context data represented in the expanded media object graph 214. The inferred context data of each group may be presented to the user as an explanation of the grouping. For example, the images may be grouped into stories based on an identified activity (e.g., "travel").

In some embodiments, in block 356 the computing device 102 may recommend an audience of one or more persons to receive the target media objects. For example, the computing device 102 may use user context models associated with several persons (e.g., social network friends) to identify persons that may be potentially interested in the target media objects. The computing device 102 may aggregate or otherwise group media objects into a story in order to improve the probability of having a large audience for the media objects. The computing device 102 may aggregate multiple activities (e.g., combining activities, places, and people to form "Food Activities in the U.S.") in order to improve the probability of having a large audience for the media objects.

In block 358, the computing device 102 provides a user experience for the target media objects. The computing device 102 may allow the user to view, browse, search, or otherwise consume the target media objects. The computing device 102 may allow the user to access the user experience using the mobile computing device 104 or other computing devices. The user experience may encompass any or all of a complete media consumption pipeline (e.g., capture/creation, consumption, sharing, etc.) In some embodiments, in block 360 the computing device 102 may tailor the media experience based on the capabilities of the device used by the user. For example, for a smaller computing device such as a smartphone, the computing device 102 may provide a streamlined interface to view the target media objects. As another example, for a larger device such as a tablet computer, laptop computer, or desktop computer, the computing device 102 may provide one or more rich, interactive media exploration interfaces. The computing device 102 may provide a "stroll" interface allowing the user to browse through the media objects organized by contextual feature. Additionally or alternatively, the computing device 102 may provide a "tour" interface in which the computing device 102 guides the user by recommending media relating to a theme or a collection of context metadata while also taking into account explicit feedback from the user.

In block 362, the computing device 102 exposes insights based on the user context model 212 and/or the selected target media objects. The computing device 102 may expose any underlying context data, inferred context data, or selection criteria used to select the target media objects. For example, the computing device 102 may present the inferred context data used to select the target media objects to the user. Exposing insights may improve transparency to the user regarding inferred context data or selected target media objects. After exposing insights, the method 300 loops back to block 302 shown in FIG. 3A to continue acquiring media objects 204. Although illustrated as executing sequentially, it should be understood that in some embodiments the processes of the method 300 may be executed continuously and/or in any order. In particular, the computing device 102 may capture and process context data 208 at any point in the media consumption pipeline (e.g., during capture/creation, consumption, sharing, etc.).

EXAMPLES

Illustrative examples of the technologies disclosed herein are provided below. An embodiment of the technologies may include any one or more, and any combination of, the examples described below.

Example 1 includes a computing device for contextual media curation, the computing device comprising content acquisition module to acquire a plurality of media objects; context capture module to capture context data associated with a context of one or more media objects of the plurality of media objects; context analysis module to (i) generate inferred context data based on the context data associated with the context of the one or more media objects, (ii) update a user context model based on the context data associated with the context of the one or more media objects and the inferred context data, and (iii) generate an expanded media object graph based on the context data associated with the context of the one or more media objects and the inferred context data, wherein the expanded media object graph is indicative of relationships between the plurality of media objects; and media experience module to select one or more target media objects from the plurality of media objects based on the user context model and the expanded media object graph.

Example 2 includes the subject matter of Example 1, and wherein the plurality of media objects comprises a plurality of image files or a plurality of video files.

Example 3 includes the subject matter of any of Examples 1 and 2, and wherein to acquire the plurality of media objects comprises to acquire the plurality of media objects from a mobile computing device.

Example 4 includes the subject matter of any of Examples 1-3, and wherein to acquire the plurality of media objects comprises to acquire the plurality of media objects from one or more media servers.

Example 5 includes the subject matter of any of Examples 1-4, and wherein to capture the context data associated with the context of the one or more media objects comprises to capture location data associated with a mobile computing device associated with the one or more media objects; and to generate the inferred context data based on the context data comprises to generate semantic location data associated with the context of the one or more media objects based on the location data associated with the mobile computing device.

Example 6 includes the subject matter of any of Examples 1-5, and wherein to capture the context data associated with the context of the one or more media objects comprises to capture user behavior data associated with the one or more media objects from a mobile computing device.

Example 7 includes the subject matter of any of Examples 1-6, and wherein to capture the context data associated with the context of the one or more media objects comprises to capture social activity data from a public media server; and to generate the inferred context data based on the context data comprises to generate inferred context data based on the social activity data.

Example 8 includes the subject matter of any of Examples 1-7, and wherein to generate the inferred context data based on the social activity data comprises to extract one or more keywords from the social activity data.

Example 9 includes the subject matter of any of Examples 1-8, and wherein to generate the inferred context data based on the social activity data comprises to perform sentiment analysis on the social activity data.

Example 10 includes the subject matter of any of Examples 1-9, and wherein to capture the context data associated with the context of the one or more media objects comprises to capture proximity data associated with a mobile computing device associated with the one or more media objects, wherein the proximity data is indicative of persons near the mobile computing device.

Example 11 includes the subject matter of any of Examples 1-10, and wherein to capture the context data associated with the context of the one or more media objects comprises to capture audio data from a mobile computing device associated with the one or more media objects; and to generate the inferred context data based on the context data associated with the current context of the one or more media objects comprises to classify an audio environment based on the audio data.

Example 12 includes the subject matter of any of Examples 1-11, and wherein to generate the inferred context data based on the context data associated with the context of the one or more media objects comprises to generate semantic time data based on the context of the one or more media objects.

Example 13 includes the subject matter of any of Examples 1-12, and wherein to generate the inferred context data based on the context data associated with the context of the one or more media objects comprises to generate an activity label associated with the context of the one or more media objects.

Example 14 includes the subject matter of any of Examples 1-13, and wherein to generate the inferred context data based on the context data associated with the context of the one or more media objects comprises to analyze image data of the plurality of media objects.

Example 15 includes the subject matter of any of Examples 1-14, and wherein the user context model comprises a current user context and a historical user context.

Example 16 includes the subject matter of any of Examples 1-15, and wherein to select the one or more target media objects from the plurality of media objects based on the user context model and the expanded media object graph comprises to perform a contextual semantic search of the plurality of media objects.

Example 17 includes the subject matter of any of Examples 1-16, and wherein to select the one or more target media objects from the plurality of media objects based on the user context model and the expanded media object graph comprises to rank the one or more target media objects based on relevance of the expanded media object graph associated with the target media objects and a current user context of the user context model.

Example 18 includes the subject matter of any of Examples 1-17, and wherein to select the one or more target media objects from the plurality of media objects based on the user context model and the expanded media object graph comprises to group the one or more target media objects based on the inferred context data.

Example 19 includes the subject matter of any of Examples 1-18, and wherein the media experience module is further to recommend one or more target persons associated with the one or more target media objects based on the user context model and the expanded media object graph.

Example 20 includes the subject matter of any of Examples 1-19, and wherein the media experience module is further to provide the one or more target media objects to a mobile computing device.

Example 21 includes the subject matter of any of Examples 1-20, and wherein the media experience module is further to provide the inferred context data to a user.

Example 22 includes a method for contextual media curation, the method comprising acquiring, by a computing device, a plurality of media objects; capturing, by the computing device, context data associated with a context of one or more media objects of the plurality of media objects; generating, by the computing device, inferred context data based on the context data associated with the context of the one or more media objects; updating, by the computing device, a user context model based on the context data associated with the context of the one or more media objects and the inferred context data; generating, by the computing device, an expanded media object graph based on the context data associated with the context of the one or more media objects and the inferred context data, wherein the expanded media object graph is indicative of relationships between the plurality of media objects; and selecting, by the computing device, one or more target media objects from the plurality of media objects based on the user context model and the expanded media object graph.

Example 23 includes the subject matter of Example 22, and wherein the plurality of media objects comprises a plurality of image files or a plurality of video files.

Example 24 includes the subject matter of any of Examples 22 and 23, and wherein acquiring the plurality of media objects comprises acquiring the plurality of media objects from a mobile computing device.

Example 25 includes the subject matter of any of Examples 22-24, and wherein acquiring the plurality of media objects comprises acquiring the plurality of media objects from one or more media servers.

Example 26 includes the subject matter of any of Examples 22-25, and wherein capturing the context data associated with the context of the one or more media objects comprises capturing location data associated with a mobile computing device associated with the one or more media objects; and generating the inferred context data based on the context data comprises generating semantic location data associated with the context of the one or more media objects based on the location data associated with the mobile computing device.

Example 27 includes the subject matter of any of Examples 22-26, and wherein capturing the context data associated with the context of the one or more media objects comprises capturing user behavior data associated with the one or more media objects from a mobile computing device.

Example 28 includes the subject matter of any of Examples 22-27, and wherein capturing the context data associated with the context of the one or more media objects comprises capturing social activity data from a public media server; and generating the inferred context data based on the context data comprises generating inferred context data based on the social activity data.

Example 29 includes the subject matter of any of Examples 22-28, and wherein generating the inferred context data based on the social activity data comprises extracting one or more keywords from the social activity data.

Example 30 includes the subject matter of any of Examples 22-29, and wherein generating the inferred context data based on the social activity data comprises performing sentiment analysis on the social activity data.

Example 31 includes the subject matter of any of Examples 22-30, and wherein capturing the context data associated with the context of the one or more media objects comprises capturing proximity data associated with a mobile computing device associated with the one or more media objects, wherein the proximity data is indicative of persons near the mobile computing device.

Example 32 includes the subject matter of any of Examples 22-31, and wherein capturing the context data associated with the context of the one or more media objects comprises capturing audio data from a mobile computing device associated with the one or more media objects; and generating the inferred context data based on the context data associated with the context of the one or more media objects comprises classifying an audio environment based on the audio data.

Example 33 includes the subject matter of any of Examples 22-32, and wherein generating the inferred context data based on the context data associated with the context of the one or more media objects comprises generating semantic time data based on the context of the one or more media objects.

Example 34 includes the subject matter of any of Examples 22-33, and wherein generating the inferred context data based on the context data associated with the context of the one or more media objects comprises generating an activity label associated with the context of the one or more media objects.

Example 35 includes the subject matter of any of Examples 22-34, and wherein generating the inferred context data based on the context data associated with the context of the one or more media objects comprises analyzing image data of the plurality of media objects.

Example 36 includes the subject matter of any of Examples 22-35, and wherein updating the user context model based on the context data associated with the context of the one or more media objects and the inferred context data comprises updating a current user context of the user context model; and updating a historical user context of the user context model.

Example 37 includes the subject matter of any of Examples 22-36, and wherein selecting the one or more target media objects from the plurality of media objects based on the user context model and the expanded media object graph comprises performing a contextual semantic search of the plurality of media objects.

Example 38 includes the subject matter of any of Examples 22-37, and wherein selecting the one or more target media objects from the plurality of media objects based on the user context model and the expanded media object graph comprises ranking the one or more target media objects based on relevance of the expanded media object graph associated with the target media objects and a current user context of the user context model.

Example 39 includes the subject matter of any of Examples 22-38, and wherein selecting the one or more target media objects from the plurality of media objects based on the user context model and the expanded media object graph comprises grouping the one or more target media objects based on the inferred context data.

Example 40 includes the subject matter of any of Examples 22-39, and further including recommending, by the computing device, one or more target persons associated with the one or more target media objects based on the user context model and the expanded media object graph.

Example 41 includes the subject matter of any of Examples 22-40, and further including providing, by the computing device, the one or more target media objects to a mobile computing device.

Example 42 includes the subject matter of any of Examples 22-41, and further including providing, by the computing device, the inferred context data to a user.

Example 43 includes a computing device comprising a processor; and a memory having stored therein a plurality of instructions that when executed by the processor cause the computing device to perform the method of any of Examples 22-42.

Example 44 includes one or more machine readable storage media comprising a plurality of instructions stored thereon that in response to being executed result in a computing device performing the method of any of Examples 22-42.

Example 45 includes a computing device comprising means for performing the method of any of Examples 22-42.

Example 46 includes a computing device for contextual media curation, the computing device comprising means for acquiring a plurality of media objects; means for capturing context data associated with a context of one or more media objects of the plurality of media objects; means for generating inferred context data based on the context data associated with the context of the one or more media objects; means for updating a user context model based on the context data associated with the context of the one or more media objects and the inferred context data; means for generating an expanded media object graph based on the context data associated with the context of the one or more media objects and the inferred context data, wherein the expanded media object graph is indicative of relationships between the plurality of media objects; and means for selecting one or more target media objects from the plurality of media objects based on the user context model and the expanded media object graph.

Example 47 includes the subject matter of Example 46, and wherein the plurality of media objects comprises a plurality of image files or a plurality of video files.

Example 48 includes the subject matter of any of Examples 46 and 47, and wherein the means for acquiring the plurality of media objects comprises means for acquiring the plurality of media objects from a mobile computing device.

Example 49 includes the subject matter of any of Examples 46-48, and wherein the means for acquiring the plurality of media objects comprises means for acquiring the plurality of media objects from one or more media servers.

Example 50 includes the subject matter of any of Examples 46-49, and wherein the means for capturing the context data associated with the context of the one or more media objects comprises means for capturing location data associated with a mobile computing device associated with the one or more media objects; and the means for generating the inferred context data based on the context data comprises means for generating semantic location data associated with the context of the one or more media objects based on the location data associated with the mobile computing device.

Example 51 includes the subject matter of any of Examples 46-50, and wherein the means for capturing the context data associated with the context of the one or more media objects comprises means for capturing user behavior data associated with the one or more media objects from a mobile computing device.

Example 52 includes the subject matter of any of Examples 46-51, and wherein the means for capturing the context data associated with the context of the one or more media objects comprises means for capturing social activity data from a public media server; and the means for generating the inferred context data based on the context data comprises means for generating inferred context data based on the social activity data.

Example 53 includes the subject matter of any of Examples 46-52, and wherein the means for generating the inferred context data based on the social activity data comprises means for extracting one or more keywords from the social activity data.

Example 54 includes the subject matter of any of Examples 46-53, and wherein the means for generating the inferred context data based on the social activity data comprises means for performing sentiment analysis on the social activity data.

Example 55 includes the subject matter of any of Examples 46-54, and wherein the means for capturing the context data associated with the context of the one or more media objects comprises means for capturing proximity data associated with a mobile computing device associated with the one or more media objects, wherein the proximity data is indicative of persons near the mobile computing device.

Example 56 includes the subject matter of any of Examples 46-55, and wherein the means for capturing the context data associated with the context of the one or more media objects comprises means for capturing audio data from a mobile computing device associated with the one or more media objects; and the means for generating the inferred context data based on the context data associated with the context of the one or more media objects comprises means for classifying an audio environment based on the audio data.

Example 57 includes the subject matter of any of Examples 46-56, and wherein the means for generating the inferred context data based on the context data associated with the context of the one or more media objects comprises means for generating semantic time data based on the context of the one or more media objects.

Example 58 includes the subject matter of any of Examples 46-57, and wherein the means for generating the inferred context data based on the context data associated with the context of the one or more media objects comprises means for generating an activity label associated with the context of the one or more media objects.

Example 59 includes the subject matter of any of Examples 46-58, and wherein the means for generating the inferred context data based on the context data associated with the context of the one or more media objects comprises means for analyzing image data of the plurality of media objects.

Example 60 includes the subject matter of any of Examples 46-59, and wherein the means for updating the user context model based on the context data associated with the context of the one or more media objects and the inferred context data comprises means for updating a current user context of the user context model; and means for updating a historical user context of the user context model.

Example 61 includes the subject matter of any of Examples 46-60, and wherein the means for selecting the one or more target media objects from the plurality of media objects based on the user context model and the expanded media object graph comprises means for performing a contextual semantic search of the plurality of media objects.

Example 62 includes the subject matter of any of Examples 46-61, and wherein the means for selecting the one or more target media objects from the plurality of media objects based on the user context model and the expanded media object graph comprises means for ranking the one or more target media objects based on relevance of the expanded media object graph associated with the target media objects and a current user context of the user context model.

Example 63 includes the subject matter of any of Examples 46-62, and wherein the means for selecting the one or more target media objects from the plurality of media objects based on the user context model and the expanded media object graph comprises means for grouping the one or more target media objects based on the inferred context data.

Example 64 includes the subject matter of any of Examples 46-63, and further including means for recommending one or more target persons associated with the one or more target media objects based on the user context model and the expanded media object graph.

Example 65 includes the subject matter of any of Examples 46-64, and further including means for providing the one or more target media objects to a mobile computing device.

Example 66 includes the subject matter of any of Examples 46-65, and further including means for providing the inferred context data to a user.

The invention claimed is:

1. A computing device for contextual media curation, the computing device comprising:
content acquisition module to acquire a plurality of media objects;
context capture module to capture context data associated with a context of one or more media objects of the plurality of media objects;
context analysis module to (i) generate inferred context data based on the context data associated with the context of the one or more media objects, (ii) update a user context model based on the context data associated with the context of the one or more media objects and the inferred context data, and (iii) generate an expanded media object graph based on the context data associated with the context of the one or more media objects and the inferred context data, wherein the expanded media object graph is indicative of relationships between the plurality of media objects; and
media experience module to select one or more target media objects from the plurality of media objects based on the user context model and the expanded media object graph, wherein to select one or more target media objects from the plurality of media objects based on the user context model and the expanded media object graph comprises to (i) group the one or more target media objects into a plurality of groupings based on the inferred context data and (ii) present the inferred context data used as a basis for the grouping as an explanation for each grouping of the plurality of groupings.

2. The computing device of claim 1, wherein:
to capture the context data associated with the context of the one or more media objects comprises to capture location data associated with a mobile computing device associated with the one or more media objects; and
to generate the inferred context data based on the context data comprises to generate semantic location data associated with the context of the one or more media objects based on the location data associated with the mobile computing device.

3. The computing device of claim 1, wherein to capture the context data associated with the context of the one or more media objects comprises to capture user behavior data associated with the one or more media objects from a mobile computing device.

4. The computing device of claim 1, wherein:
to capture the context data associated with the context of the one or more media objects comprises to capture social activity data from a public media server; and
to generate the inferred context data based on the context data comprises to generate inferred context data based on the social activity data.

5. The computing device of claim 4, wherein to generate inferred context data based on the social activity data comprises to perform sentiment analysis on the social activity data.

6. The computing device of claim 1, wherein to capture the context data associated with the context of the one or more media objects comprises to capture proximity data associated with a mobile computing device associated with the one or more media objects, wherein the proximity data is indicative of persons near the mobile computing device.

7. The computing device of claim 1, wherein:
to capture the context data associated with the context of the one or more media objects comprises to capture audio data from an audio sensor of a mobile computing device associated with the one or more media objects; and
to generate the inferred context data based on the context data associated with the current context of the one or more media objects comprises to classify an audio environment based on the audio data.

8. The computing device of claim 1, wherein to generate the inferred context data based on the context data associated with the context of the one or more media objects comprises to generate semantic time data based on the context of the one or more media objects.

9. The computing device of claim 1, wherein to generate the inferred context data based on the context data associated with the context of the one or more media objects comprises to generate an activity label associated with the context of the one or more media objects.

10. The computing device of claim 1, wherein to generate the inferred context data based on the context data associated with the context of the one or more media objects comprises to analyze image data of the plurality of media objects.

11. The computing device of claim 1, wherein to select the one or more target media objects from the plurality of media objects based on the user context model and the expanded media object graph comprises to perform a contextual semantic search of the plurality of media objects.

12. The computing device of claim 1, wherein to select the one or more target media objects from the plurality of media objects based on the user context model and the expanded media object graph comprises to rank the one or more target media objects based on relevance of the expanded media object graph associated with the target media objects and a current user context of the user context model.

13. The computing device of claim 1, wherein the media experience module is further to recommend one or more target persons associated with the one or more target media objects based on the user context model and the expanded media object graph.

14. A method for contextual media curation, the method comprising:
    acquiring, by a computing device, a plurality of media objects;
    capturing, by the computing device, context data associated with a context of one or more media objects of the plurality of media objects;
    generating, by the computing device, inferred context data based on the context data associated with the context of the one or more media objects;
    updating, by the computing device, a user context model based on the context data associated with the context of the one or more media objects and the inferred context data;
    generating, by the computing device, an expanded media object graph based on the context data associated with the context of the one or more media objects and the inferred context data, wherein the expanded media object graph is indicative of relationships between the plurality of media objects; and
    selecting, by the computing device, one or more target media objects from the plurality of media objects based on the user context model and the expanded media object graph, wherein selecting one or more target media objects from the plurality of media objects based on the user context model and the expanded media object graph comprises (i) grouping the one or more target media objects into a plurality of groupings based on the inferred context data and (ii) presenting the inferred context data used as a basis for the grouping as an explanation for each grouping of the plurality of groupings.

15. The method of claim 14, wherein:
    capturing the context data associated with the context of the one or more media objects comprises capturing location data associated with a mobile computing device associated with the one or more media objects; and
    generating the inferred context data based on the context data comprises generating semantic location data associated with the context of the one or more media objects based on the location data associated with the mobile computing device.

16. The method of claim 14, wherein:
    capturing the context data associated with the context of the one or more media objects comprises capturing social activity data from a public media server; and
    generating the inferred context data based on the context data comprises generating inferred context data based on the social activity data.

17. The method of claim 14, wherein selecting the one or more target media objects from the plurality of media objects based on the user context model and the expanded media object graph comprises performing a contextual semantic search of the plurality of media objects.

18. The method of claim 14, wherein selecting the one or more target media objects from the plurality of media objects based on the user context model and the expanded media object graph comprises ranking the one or more target media objects based on relevance of the expanded media object graph associated with the target media objects and a current user context of the user context model.

19. The method of claim 14, further comprising recommending, by the computing device, one or more target persons associated with the one or more target media objects based on the user context model and the expanded media object graph.

20. One or more non-transitory, computer-readable storage media comprising a plurality of instructions that in response to being executed cause a computing device to:
    acquire a plurality of media objects;
    capture context data associated with a context of one or more media objects of the plurality of media objects;
    generate inferred context data based on the context data associated with the context of the one or more media objects;
    update a user context model based on the context data associated with the context of the one or more media objects and the inferred context data;
    generate an expanded media object graph based on the context data associated with the context of the one or more media objects and the inferred context data, wherein the expanded media object graph is indicative of relationships between the plurality of media objects; and
    select one or more target media objects from the plurality of media objects based on the user context model and the expanded media object graph, wherein to select one or more target media objects from the plurality of media objects based on the user context model and the expanded media object graph comprises to (i) group the one or more target media objects into a plurality of groupings based on the inferred context data and (ii) present the inferred context data used as a basis for the grouping as an explanation for each grouping of the plurality of groupings.

21. The one or more non-transitory, computer-readable storage media of claim 20, wherein:
    to capture the context data associated with the context of the one or more media objects comprises to capture location data associated with a mobile computing device associated with the one or more media objects; and
    to generate the inferred context data based on the context data comprises to generate semantic location data associated with the context of the one or more media objects based on the location data associated with the mobile computing device.

22. The one or more non-transitory, computer-readable storage media of claim 20, wherein:

to capture the context data associated with the context of the one or more media objects comprises to capture social activity data from a public media server; and to generate the inferred context data based on the context data comprises to generate inferred context data based on the social activity data.

23. The one or more non-transitory, computer-readable storage media of claim 20, wherein to select the one or more target media objects from the plurality of media objects based on the user context model and the expanded media object graph comprises to perform a contextual semantic search of the plurality of media objects.

24. The one or more non-transitory, computer-readable storage media of claim 20, wherein to select the one or more target media objects from the plurality of media objects based on the user context model and the expanded media object graph comprises to rank the one or more target media objects based on relevance of the expanded media object graph associated with the target media objects and a current user context of the user context model.

25. The one or more non-transitory, computer-readable storage media of claim 20, further comprising a plurality of instructions that in response to being executed cause the computing device to recommend one or more target persons associated with the one or more target media objects based on the user context model and the expanded media object graph.

* * * * *